J. W. BAKER & G. H. PARKER.
GAME APPARATUS.
APPLICATION FILED MAY 22, 1915.
1,286,491.
Patented Dec. 3, 1918.
7 SHEETS—SHEET 7.
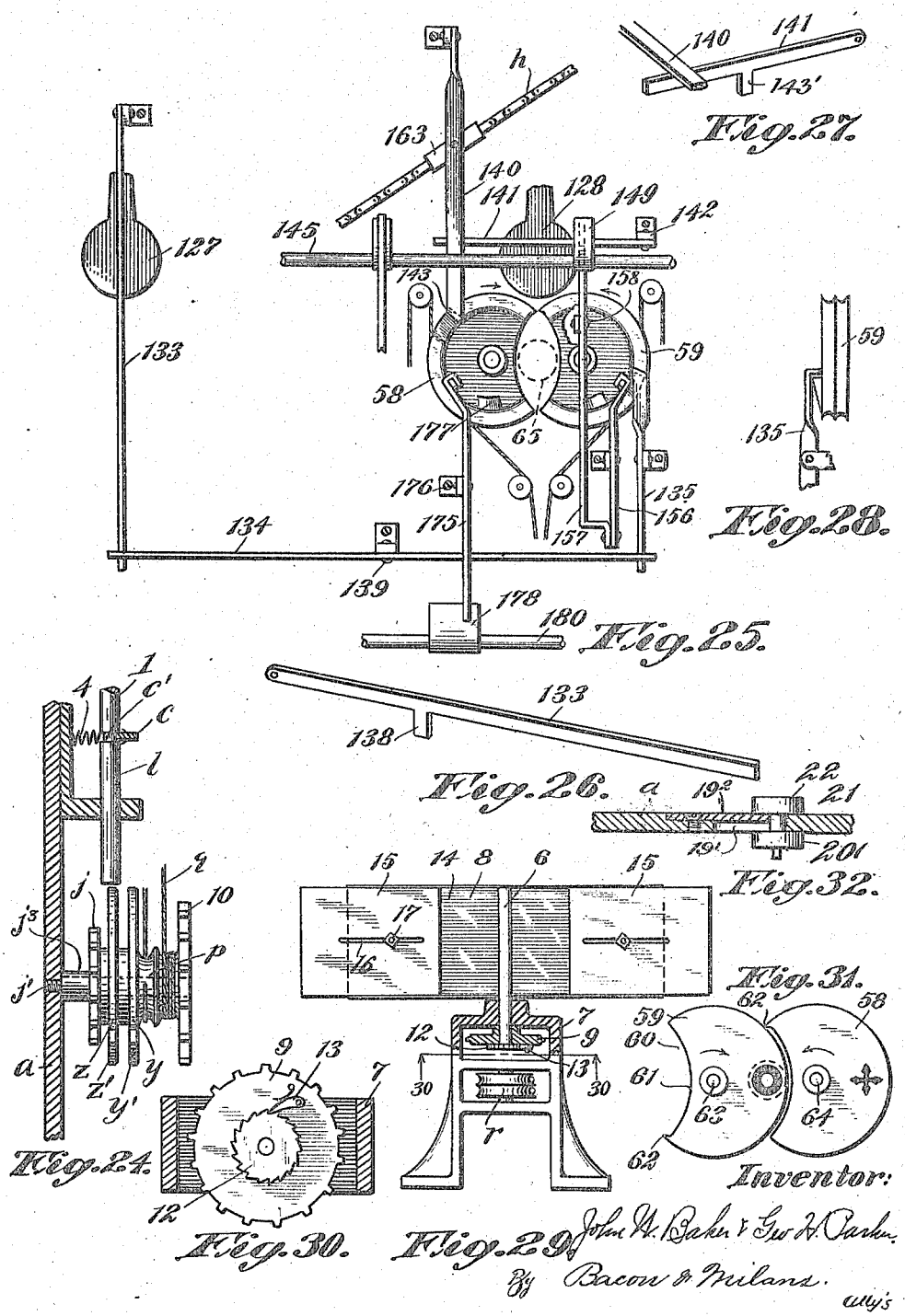

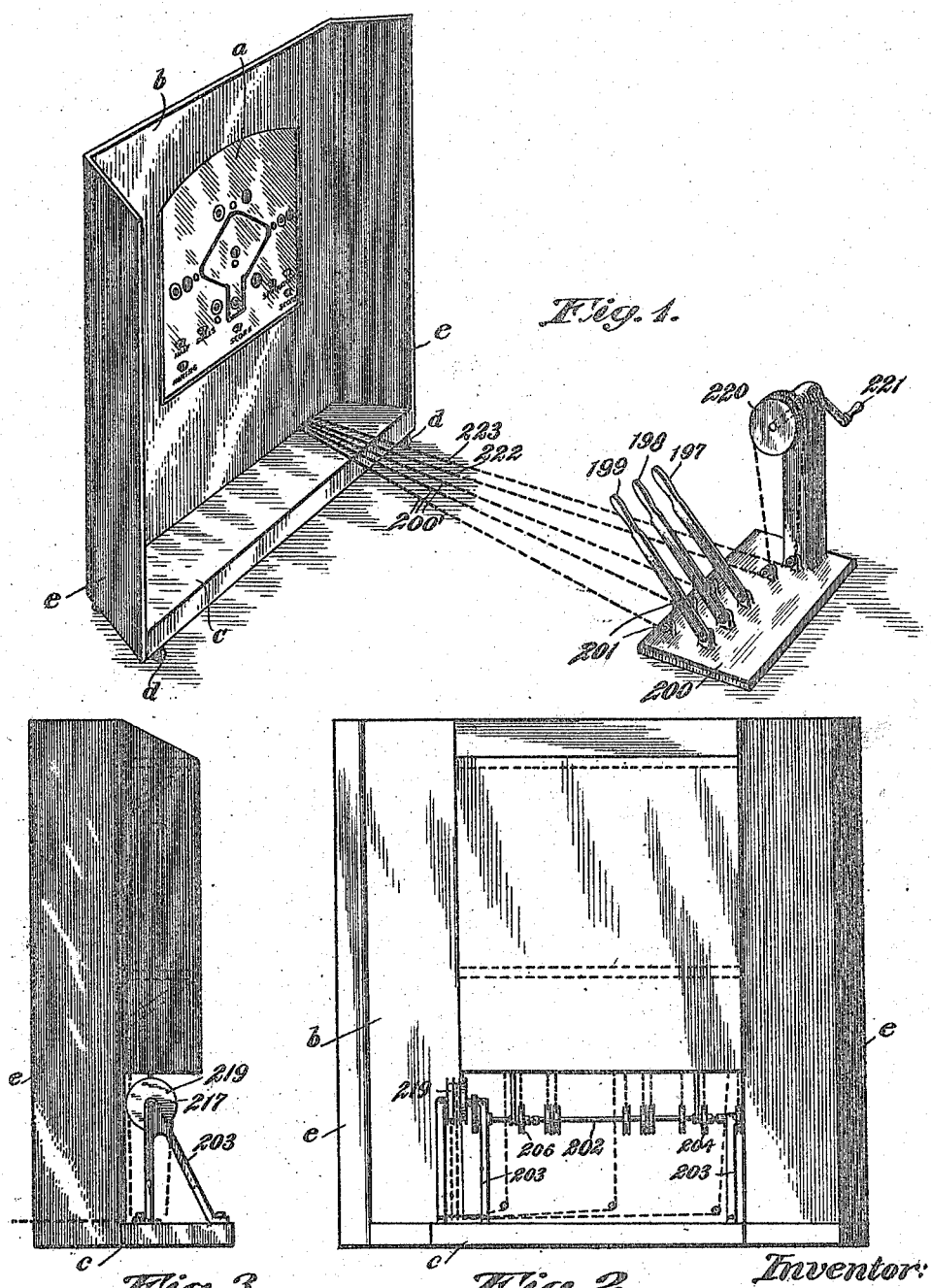

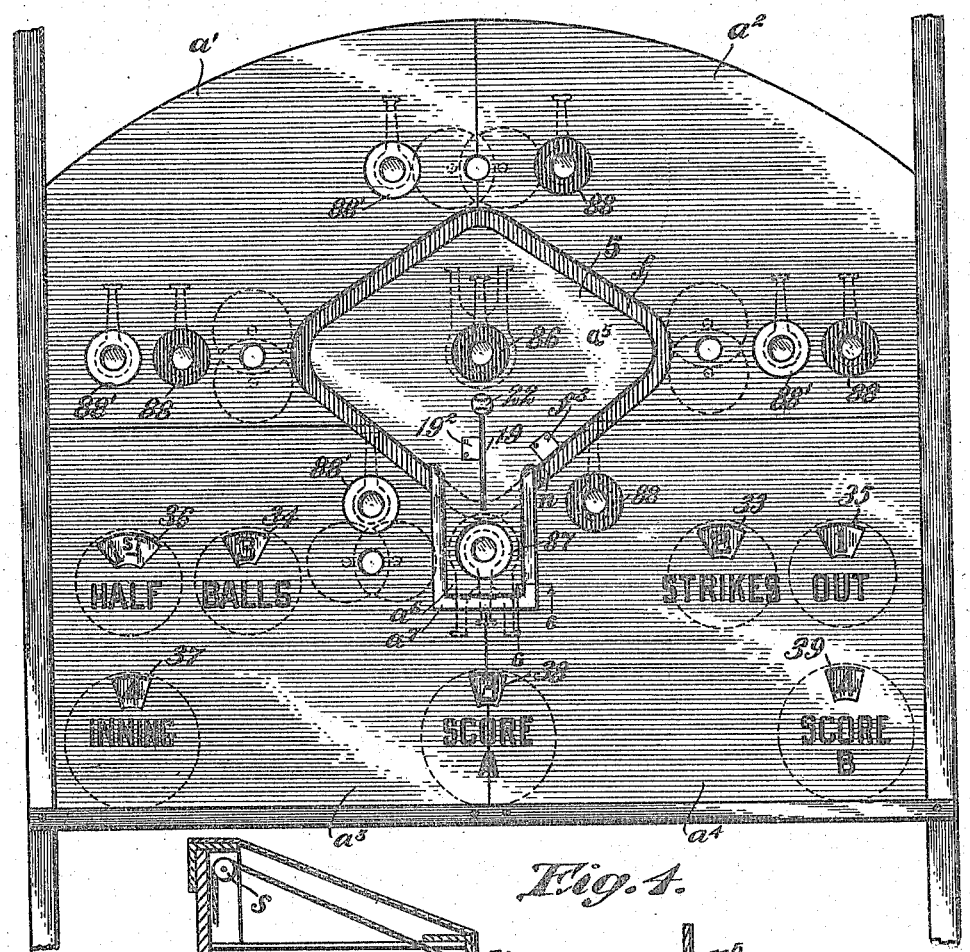
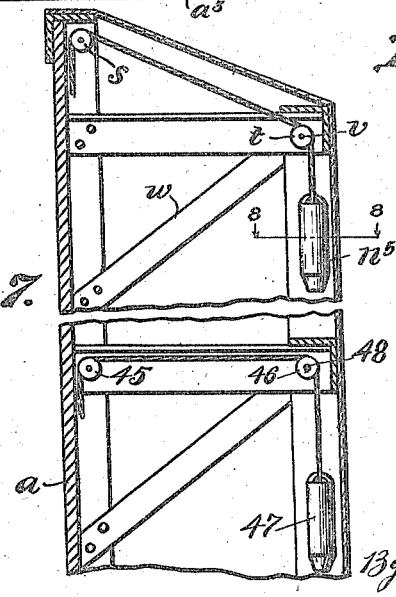
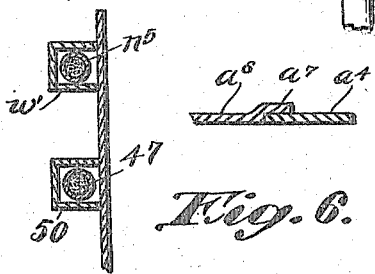

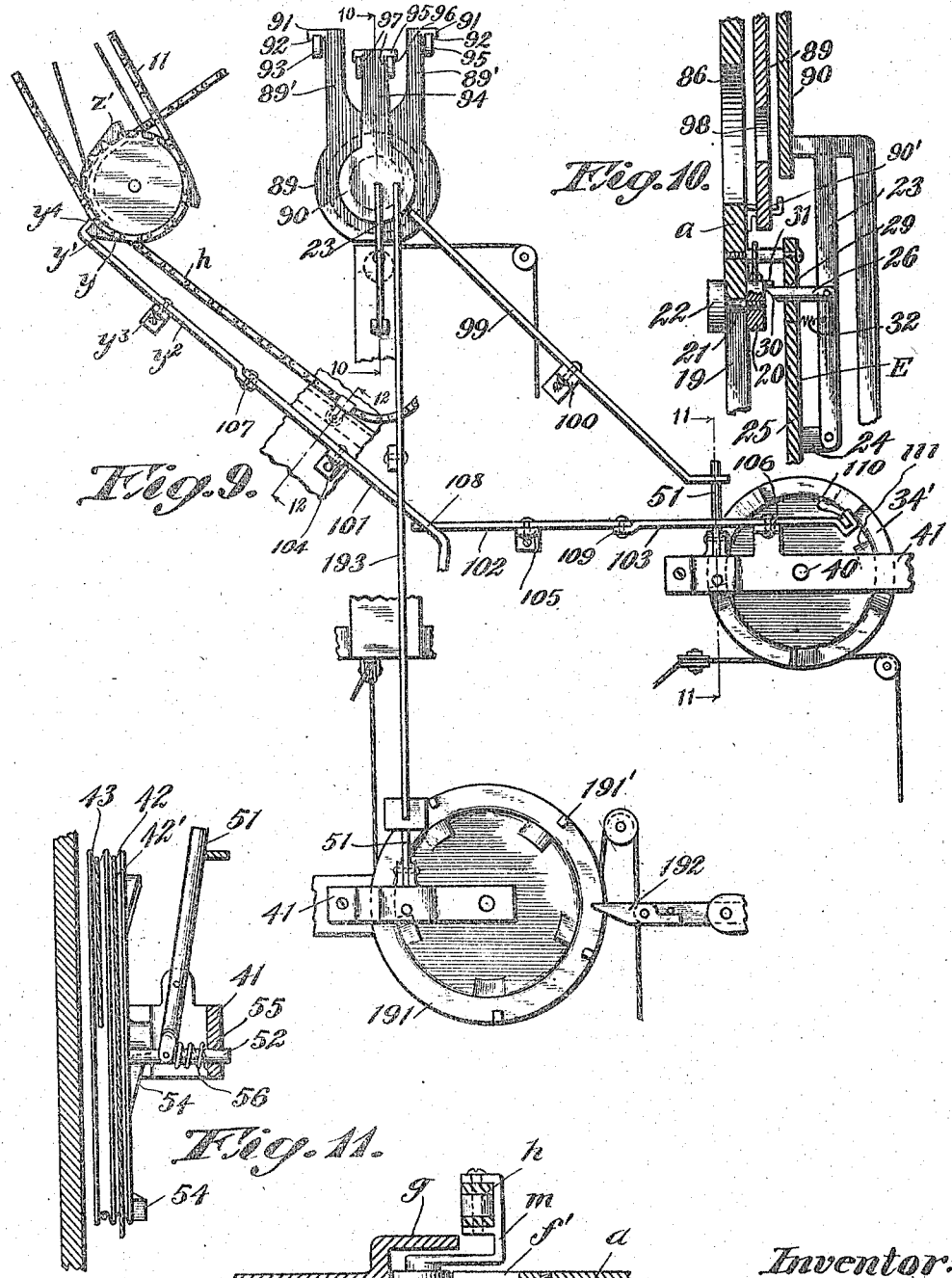

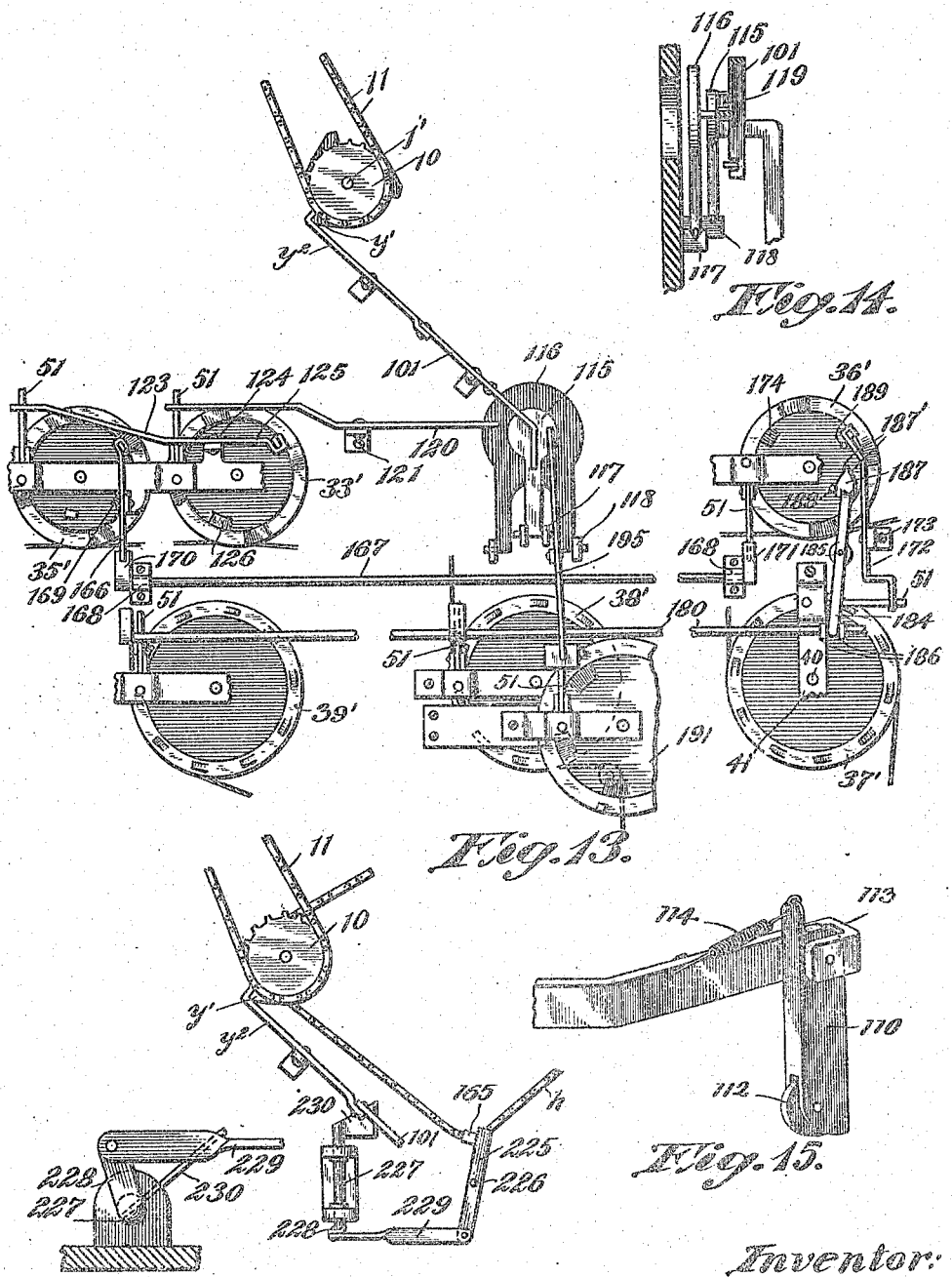

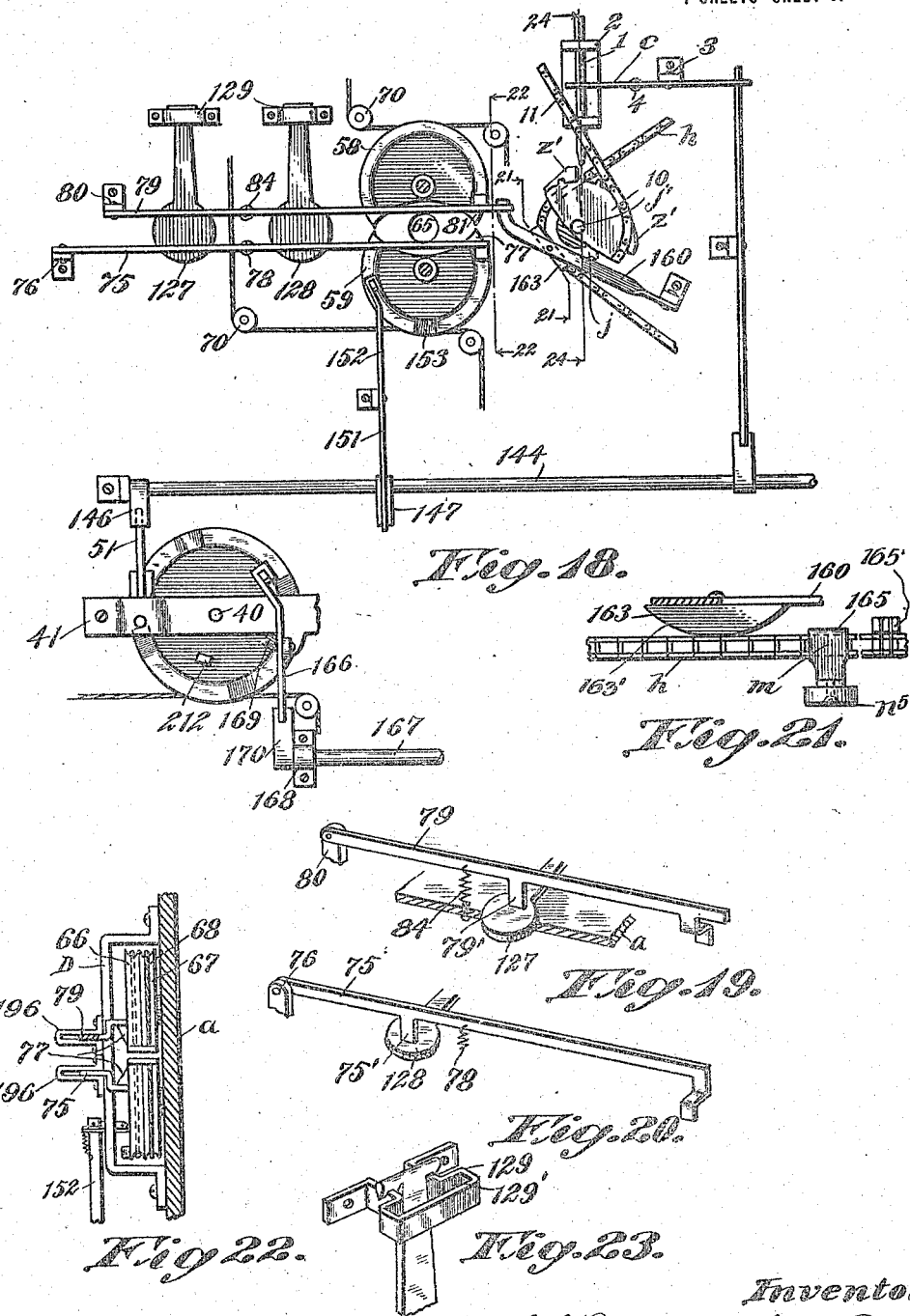

UNITED STATES PATENT OFFICE.

JOHN W. BAKER AND GEORGE HENRY PARKER, OF STAMFORD, CONNECTICUT; SAID PARKER ASSIGNOR TO SAID BAKER.

GAME APPARATUS.

1,286,491.  Specification of Letters Patent.  Patented Dec. 3, 1918.

Application filed May 22, 1915.   Serial No. 29,804.

*To all whom it may concern:*

Be it known that we, JOHN W. BAKER and GEORGE HENRY PARKER, citizens of the United States, residing at Stamford, in the county of Fairfield and State of Connecticut, have invented certain new and useful Improvements in Game Apparatus, of which the following is a specification, reference being had therein to the accompanying drawing.

This invention relates to an improved game apparatus.

The invention broadly comprehends the provision of an improved game apparatus comprising target mechanism and means controlled thereby and adapted to indicate or portray features, situations, plays or moves of a game or contest such as base ball, cricket, yacht, horse, foot and automobile races, or the like, whereby a game or contest of the character referred to can be played through the medium of the target mechanism, the target mechanism being adapted to be shot at in competition and the indicating mechanism serving to indicate certain moves and plays depending upon the accuracy, rapidity and general skill displayed by the respective contestants in hitting the target mechanism.

The object of the invention is to provide an improved game apparatus of this nature which will afford, both to the player and spectator all the interest and excitement of a real game while at the same time furnishing a sharp test in markmanship, the apparatus being adapted for use in shooting galleries, armories, military schools, clubs, amusement parks, and similar purposes.

A further object of the invention is to provide an improved game apparatus of the character referred to which will be strong and durable, reliable in operation and which can be quickly and conveniently reset after the same has been operated.

The invention more particularly contemplates a wall or board bearing the representation of a miniature field and sets of indicating devices and rifle targets controlling the same, the rifle targets being appropriately located on the board regarding certain positions or centers of play in the field and adapted to control the play at these points, and some of the indicating devices being also arranged on the board respecting certain positions in the field, the indicating devices serving to indicate the various plays or moves throughout a game or contest and the respective indicating devices acting automatically upon the hitting of the targets controlling the same.

The invention consists in the features of construction, combinations of elements and arrangement of parts which will be exemplified in the construction hereinafter described, and the scope of the application of which will be indicated in the appended claims.

The accompanying drawings illustrate one embodiment of the invention, the same being shown adapted to the game of base-ball.

Figure 1 is a perspective view of a game apparatus constructed in accordance with the invention;

Fig. 2 is a rear elevation;

Fig. 3 is a side elevation;

Fig. 4 is a front elevation, on an enlarged scale, of the wall or board with certain parts of the target and indicating mechanism indicated in dotted lines;

Fig. 6 is a detailed sectional view taken on the line 6—6 of Fig. 4;

Fig. 7 is a vertical sectional view of the upper portion of the board and illustrating certain flexible connections and weights forming part of the operating mechanism;

Fig. 8 is a horizontal section taken on the line 8—8 of Fig. 7;

Fig. 9 is a detailed view on an enlarged scale of the target device at the pitcher's box and the operating mechanism associated directly therewith, the parts being shown in rear elevation;

Fig. 10 is a vertical section taken on the line 10—10 of Fig. 9;

Fig. 11 is a vertical section taken on the line 11—11 of Fig. 9;

Fig. 12 is a horizontal section taken on the line 12—12 of Fig. 9;

Fig. 13 is a detailed view, on an enlarged scale, of the target devices at the batter's box, with certain of the indicating mechanism and operative connections associated directly therewith, the parts being shown in rear elevation;

Fig. 14 is a detailed view of the target devices at the batter's box, the same being shown in end elevation and a portion of the board in vertical section;

Fig. 15 is a detailed view, on an enlarged scale, of one end of one of the pawls or levers forming part of the escapement mechanism for one of the indicating devices;

Fig. 16 is a detailed view of certain locking and resetting mechanisms for one of the indicators, the parts being shown in rear elevation;

Fig. 17 is a detailed end elevation of part of the locking mechanism shown in Fig. 16;

Fig. 18 is a detailed view of the target devices and the indicating mechanism at first base, with certain locking mechanism for one of the indicating means and other operative connections associated directly therewith;

Figs. 19 and 20 are detail views of two of the escapement levers, and the connection thereof with the targets;

Fig. 21 is a detailed sectional view taken on the line 21—21 of Fig. 18;

Fig. 22 is a detailed sectional view taken on the line 22—22 of Fig. 18;

Fig. 23 is a detailed view illustrating the pivotal mounting of certain of the targets;

Fig. 24 is a detailed sectional view taken on the line 24—24 of Fig. 18;

Fig. 25 is a detailed view of the out and safe targets and allied mechanism located adjacent the batter's box, the parts being shown in rear elevation;

Fig. 26 is a detailed view of one of the operating levers;

Fig. 27 is a detailed view illustrating the arrangement of two of the operating levers;

Fig. 28 is a detailed end elevation of part of the escapement mechanism for one of the indicators;

Fig. 29 is a detailed view of the regulator fan;

Fig. 30 is a detailed sectional view taken on the line 30—30 of Fig. 29;

Fig. 31 is a detailed view of the base indicating devices, the parts being shown in front elevation with the out indicator in position to register an out.

Figure 5:
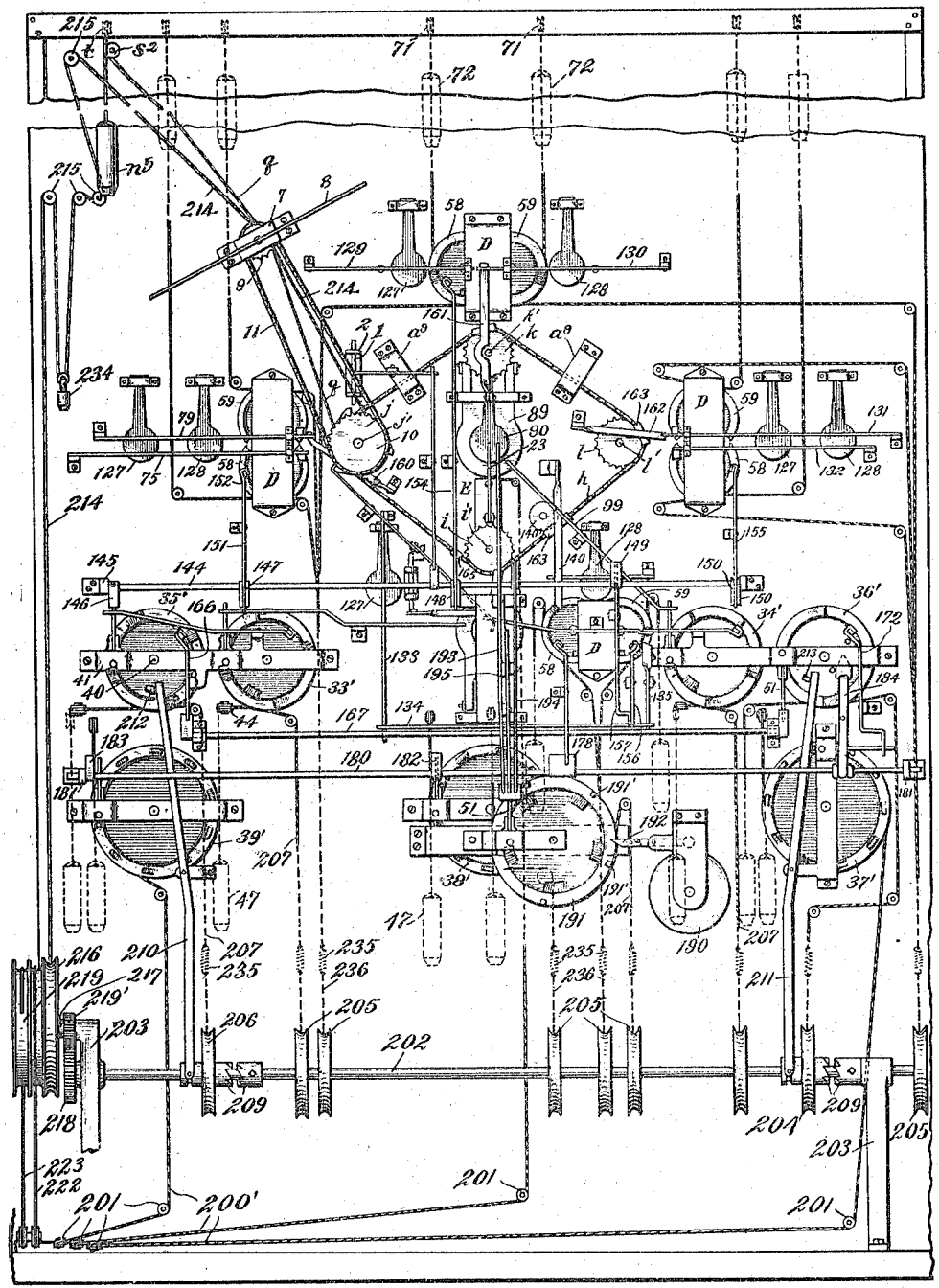
Fig. 5 is a rear elevation on a larger scale than that of Fig. 1, with the cover plate at the rear removed.

Referring to the drawings in detail, $a$ designates a wall or board bearing on its front face the representation of a base ball field and having mounted thereon the target and indicating mechanism. The board $a$ may be supported in upright position in any desired way. In the drawings, the board is shown attached to a supporting frame $b$ having a base or platform $c$ that is provided with wheel supports $d$. The front face of the frame $b$ may be furnished with scenery appropriate to the character of the game, and said frame is provided with guard wings $e$ projecting forwardly from the ends thereof to prevent the spattering of lead. The wall or board is adapted to withstand the impact of the usual rifle target bullet, and an advantageous construction for the board is that illustrated in the drawings, (see particularly Fig. 4 of the drawings) in which the board is made up of separate plates of metal $a'$, $a^2$, $a^3$ and $a^4$ suitably connected to each other and secured at their outer marginal portions to the frame $b$, and a central plate $a^5$ having the shape of the diamond, this latter plate being provided with an apron or extension $a^6$ that fits in a socket formed by a flange $a^7$ extending forwardly from the front of plates $a'$ and $a^2$. The apron or extension is detachably secured to the flange $a^7$ in any suitable manner, said plate $a'$ extending in the same vertical plane as the outer plates, and this central plate is further held in position by U-shaped tie plates $a^9$ having their ends secured to adjoining marginal portions of said plate and the outer plates at the rear faces thereof.

The board is provided with a slot or way $f$ following the outline of the diamond and terminating at points at opposite sides of the home base. In the construction shown this slot or channel way is provided by making the central plate $a^5$ of such size as to leave the necessary space between the edge of said plate and the inner edges of the outer plates. On the outer plates is a flange $g$ (see Fig. 12) projecting from the rear faces thereof and extending over and around the slot or channel way $f$, the front face of the portion of the flange that is visible through the slot or way $f$ being painted or otherwise colored to represent the paths between the bases around the diamond. At the rear of the board is a conveyer $h$ shown in the drawing as a sprocket chain which is trained over sprocket wheels $i$, $j$, $k$, and $l$ mounted for rotation at the points of the diamond on short shafts $i'$, $j'$, $k'$ and $l'$. An arm $m$ is detachably connected at one end by screws $m'$ with one of the links of the chain $h$, said arm extending outwardly from the conveyer and then forwardly to the slot or way $f$ and carrying at its outer end a circular block or piece $n$ adapted to work in the slot or way $f$ to indicate a player at the batter's box, and running from base to base. A motor is provided to operate the conveyer in one direction to carry the piece or block $n$ from normal position at the batter's box around the bases. The motor shown is of the mechanical weight type. The sprocket wheel $j$ is fixed to the inner end of a sleeve $j^3$ loosely engaging the shaft $j'$, and to this sleeve is fixed a double grooved pulley or drum $p$ (see Fig. 24). One end of a cord or other flexible member $q$ is secured to the drum and wound thereon in one of the grooves thereof. From the drum the cord or flexible member $q$ is carried up over a pulley $r$ mounted in a bracket 7 secured to the rear face of the board. From the pulley $r$ the cord or flexible member $q$ is carried under a pulley $r^2$, up over a pulley $s$ and out and down over a pulley $t$, (see Figs. 5, 7 and 29). A weight $n^5$ of any suitable form is attached to the free end of the flexible member.

The pulley $t$ is mounted on a rod $v$ spaced from and extending across the frame at the rear and near the top thereof so that the weight hangs free from the rear face of the board, said rod being supported by brackets $w$ secured to the frame $b$. $w'$ designates a conventional form of guide for the weight. As will be understood, the weight is adapted to move downwardly unwinding the flexible member from the drum, rotating the drum, and operating the conveyer.

Associated with the conveyer $h$ is an escapement or trigger mechanism, reference being had particularly to Figs. 9 and 16, adapted to hold the conveyer locked against movement by its motor, said escapement mechanism comprising a wheel or disk $y$ fixed to the sleeve $j^3$ and provided with a single ratchet tooth $y'$. A trigger or lever $y^2$ pivoted intermediate its ends to a bracket $y^3$ has at its forward end a laterally projecting tooth $y^4$ adapted when the forward end of the lever is depressed to engage in front of the tooth $y'$ of the wheel $y$ and hold the conveyer locked against movement by the motor. By depressing the rear end of the lever, the forward end of the lever will be elevated and the tooth $y^4$ withdrawn from engagement with the tooth $y'$ of the wheel releasing the same and permitting the motor to operate the conveyer.

Locking mechanism is provided whereby when the conveyer is being driven by the motor the same may be stopped and locked against movement to arrest the circular block or piece in its movement about the diamond. Referring particularly to Figs. 18 and 24, said mechanism comprises a wheel or disk $z$ fixed to the sleeve $j^3$ and provided with a plurality of ratchet teeth $z'$. A pawl 1 is slidably mounted in a bracket 2 for vertical movement into and out of engagement with the teeth $z'$ of the wheel $z$. The pawl is normally held elevated out of engagement with the wheel (see Figs. 18 and 24 of the drawings) by a trigger or lever C pivoted intermediate its ends to a post 3 the forward end of the trigger engaging a notch or groove $C'$ in the pawl 1, the trigger being normally maintained in engagement with the notch $c'$ by a coiled spring 4 having its ends connected respectively to the board and to the said trigger. By depressing the rear end of the trigger, the forward end is disengaged from the notch of the pawl and the pawl released. Upon being released the pawl is adapted to drop by gravity until its lower end rests upon the wheel $z$, the lower end of the pawl engaging a tooth of the wheel and locking the conveyer against further movement by its motor. The rear faces of the teeth $z'$ of the wheel $z$ are beveled or curved, and upon the wheel being rotated in a reverse direction they serve to force the pawl upward to normal position, the forward end of the trigger automatically engaging the notch of the pawl as the same is returned to position.

In order to govern the speed at which the conveyer is driven by its motor to move the indicator block or piece around the diamond, a regulator shown in detail in Figs. 29 and 30 is provided comprising a shaft 6 supported for rotation in a suitable bracket 7, and fan blades 8 secured to the shaft. On the fan shaft is a sprocket wheel 9 and fixed to the outer end of the sleeve $j^3$ is a sprocket wheel 10, said sprocket wheels being operatively connected by a sprocket chain 11. The sprocket wheel 9 is loosely mounted on the fan shaft and is adapted to rotate independently thereof when turned in one direction. A clutch is provided to couple the sprocket wheel to the fan shaft when the sprocket wheel is driven in the opposite direction by the motor. Any approved form of clutch may be employed for this purpose, the clutch shown comprising a ratchet wheel 12 fast to the fan shaft adjacent the sprocket wheel 9, and a spring pressed pawl 13 pivotally mounted on the sprocket wheel 9 and coöperating with the said ratchet wheel. The blades of the regulator fan are adjustable and through the adjustment of the same the retarding effect of the fan can be regulated and varied, and the speed at which the conveyer is driven by its motor accordingly regulated and varied. The construction of fan blade shown consists of an inner section 14 and an outer section 15, the outer section being provided with an elongated slot 16. A screw 17 extends through the slot 16 into the outer section 14 and serves to securely clamp the sections together.

The board is also provided with a slot or way 19 extending from near the pitcher's box to a point adjacent the batter's box, and in this slot is adapted to play a movable indicator to indicate the throwing of the ball by the pitcher to the batter (see Fig. 10) said indicator consisting of a block 20 adapted to slide on the rear face of the board and having an arm 21 projecting forwardly therefrom through the slot 19 and carrying at its forward end a circular disk or piece 22, which may be provided on its front face with a representation of a base ball. The arm 21 is shown provided with a threaded end in threaded engagement with an opening in the block 20 whereby the arm with its piece or disk can be readily connected to and disconnected from the block. The ball indicator is adapted to normally occupy the position indicated in Figs. 4 and 10 of the drawings and is held in this position by a trigger mechanism comprising a lever 23 pivoted at one end to a post 24 extending rearwardly from a plate 25 spaced from the rear face of the board and connected thereto in any suitable manner. Mounted on the lever intermediate the ends thereof is a pawl 26. The pawl, which is pivoted at its rear end to the lever is adapted to work through an opening 29 in the plate 25 and is provided with a beveled tooth 30 at its forward end to coöperate with a tooth 31 on the rear face of the block 20. A coiled spring 32 having its ends connected respectively to the said plate and the lever serves to normally maintain the lever pressed inwardly with its pawl in engagement with the tooth of the block. The lever 23 is adapted to be moved rearwardly against the tension of the spring to withdraw the tooth 30 of the pawl from engagement with the tooth of the block, which upon being released is adapted to drop downwardly by gravity and occupy a position at the lower end of the slot or way 19. Upon movement of the block 20 to normal position at the upper end of the slot or way 19, the tooth of the block engages the beveled face of the pawl forcing the same outwardly and permitting the tooth of the block to pass the pawl, which then springs into locking position behind the tooth of the block.

The slot or way 19 and the slot or way $f$ are both preferably provided with lateral extensions 19′ and $f'$ to facilitate the ready assembling or removal of the parts of the movable indicators. These lateral openings 19′ and $f'$ are normally closed by small plates $19^2$ and $f^3$ detachably connected in place in any suitable manner for instance by screws as shown.

Below the field the board is provided with apertures 33, 34, 35, 36, 37, 38, and 39, and below the apertures are the inscriptions "Strikes" "Balls" "Out" "Half inning" "Innings" "Score A" "Score B." At the rear of the board there is an indicator for each aperture bearing appropriate characters to be displayed therethrough, the several indicators 33′, 34′, 35′, 36′, 37′, 38′ and 39′ being adapted to register respectively strikes, balls, outs, the half inning, the inning, and the score for each side or team. The several indicators are of substantially the same general construction and preferably take the form of a wheel or rotatable disk. Each indicator is adapted to be advanced step by step to display the characters thereon, one at a time, through the aperture, and there is provided for each indicator a motor to advance the same, and escapement mechanism controlling the operation of the indicator by its motor. The motors, for this purpose, shown in the drawings, are the same as the motor for the conveyer $h$ hereinbefore described, and the escapement mechanism for the several indicators are all of substantially the same construction.

With respect to each of the indicator wheels and the motor and escapement mechanism appertaining thereto, and with particular reference to Figs. 4, 5, 7 and 11 of the drawings, each wheel is mounted for rotation on a shaft 40 supported in a bracket 41, and each wheel has a pair of grooves 42, 43 in its periphery. A cord or other flexible member 42′ is secured to the wheel and wound in one of the grooves 42. From the groove in the wheel the flexible member extends over pulleys 44, 45 and out and down over a pulley 46, and a suitable weight 47 is attached to the other end of the flexible member. The pulleys 46 are mounted on a transverse bar 48 supported in spaced relation from the rear face of the board by brackets 49, so that the weights 47 of the motors all hang free from the face of the board, a guide 50 being provided for each of the weights. The escapement mechanism for each wheel (see Fig. 11) comprises a lever 51 pivoted intermediate its ends to the bracket 41. Pivoted to the inner end of the lever 51 intermediate its ends is a pawl 52, the lower end of which is adapted to coöperate with ratchet teeth 54 on the wheel, the inner end of the pawl slidably engages an opening 55 in the bracket, and a coiled spring 56 is mounted on the pawl between the bracket and the inner end of the lever, said spring serving to normally maintain the forward end of the lever depressed, with the lower end of the pawl pressed against the disk to engage a tooth of the wheel and hold the same locked against movement by its motor. The rear end of the lever 51 is adapted to be depressed to move the pawl outwardly and to withdraw the lower end thereof out of engagement with the tooth of the wheel to permit the wheel to be advanced one step by its motor, the pawl, after the tooth has passed by the same, being returned by the spring and engaging the succeeding tooth on the wheel and again locking the wheel from movement. Upon turning the wheel back to normal position, the pawl rides up over the rear beveled faces of the teeth on the wheel.

To denote that a runner is safe or out at the bases we provide at each base two indicator wheels or circular disks 58, 59, the wheel 58 bearing a symbol such as a small "cross" to indicate "safe", and the wheel 59 bearing a different symbol or marking such as a small "circle" to indicate "out." (See Figs. 4, 18, 28 and 31 of the drawings). Each of the wheels, which are of the same size and shape, is provided with an opening 60 extending inwardly from the periphery thereof, the walls 61 of the opening extending in a curve of part of a circle concentric with the periphery of the other wheel. At one end of the curved wall 61 is a small pointed or knife edge projection 62. The wheels are mounted on shafts 63, 64 for rotation in the same vertical plane and they normally occupy the position shown in Fig. 25 of the drawings, with their openings 60 and the pointed or knife edge projections 62 disposed opposite to each other. Each wheel is adapted to be rotated in the direction of the arrow to bring its signal character opposite an opening 65 in the face of the board. For this purpose each wheel is provided with a motor, and with escapement mechanism adapted to normally hold the wheels locked in the position indicated in Fig. 5 against movement by their motors. Referring particularly to Fig. 22, each wheel is provided with a pair of grooves 66, 67 in its periphery and to each wheel is secured a cord or other flexible member 68 adapted to extend partially around the wheel within one of the grooves 66. From the grooves 66 of the wheels the flexible members 68 extend over pulleys 69, 70 and out and down over pulleys 71, and weights 72 are connected to the free outer ends of the flexible members.

With particular reference to Figs. 18, 19, 20 of the drawings, the escapement mechanism for the wheel 59 of the pair of indicators located at first base comprises a lever 75 pivoted at one end to a bracket 76 and having its other end extending in rear of the wheel 58 and adapted to engage a tooth 77 on the wheel to lock the wheel against movement by its motor, the lever 75 being normally held pressed inwardly with its forward end in engagement with the tooth of the wheel by a coiled spring 78, having its ends connected respectively to the lever and board. Said lever 75 is adapted to be engaged intermediate its ends and moved outward against the tension of the spring 78 to withdraw its forward end out of engagement with the tooth of the wheel, releasing the wheel so that the same will be operated by its motor.

The escapement mechanism for the companion indicator wheel 58 comprises a lever 79 pivoted at one end to a bracket 80, the forward end of the lever extending across the disk 59 in rear thereof and being adapted to engage a tooth 81 on the said wheel. The lever 79 is normally held pressed inwardly with its forward end in engagement with the tooth of the said wheel by a coiled spring 84, said spring having its ends connected respectively to the lever and board.

The distance between the shafts 63, 64 of the indicator wheels 58, 59 is such that with the wheels in the position indicated in Fig. 18, either one of the wheels, upon being released by its escapement mechanism can be rotated to bring its signal character or marking opposite an opening 65 in the face of the board, the wheel that is operated entering and working through the opening in the other wheel and preventing the same from being operated. In Fig. 31 is shown the position of the wheels after the wheel 59 has been operated to bring its signal character opposite the opening 65. The escapement lever 75 and the escapement lever 79 are adapted to be operated to release the indicator wheels by independent target members shot at in competition, as will hereinafter be more fully described. If only one of the escapement levers 75, 79 is operated, the wheel released will rotate in the opening of the other wheel without contacting therewith. Should both of the escapement levers 75 and 79 be operated, one slightly before the other, the wheels are prevented from blocking by the pointed or knife edge projections 62, the wheel first released getting the right of way. Should both wheels be released at the same time and the knife edge projections 62 engage each other, the wheels will block each other and neither wheel can turn to register its signal. When the escapement mechanisms of both indicator wheels are actuated, the pointed or knife edge projections 62 of the indicator wheel that has gained the right of way engages the inner curved wall 61 of the other wheel while the pointed or knife edge projection of the other indicator wheel contacts with the peripheral portion of the other wheel. In this connection it will be observed that the contact between the wheels will only be through the projections 62, and the resistance to the movement of the wheel having the right of way due to friction will be very small, this construction always insuring the effective operation of one of the indicator wheels in the event that both of the escapement levers are actuated one before the other, the operation of the indicators through their respective targets being thus adjusted or regulated to a nicety.

The various indicators, hereinbefore described are all controlled through a plurality of movable target members which are adapted to be operated by the impact of a shot or missile thereagainst. At the pitcher's box and at the batter's box are openings 86, 87, and at each of the bases are pairs of openings 88, 88', and located at the rear of the board in rear of the several openings are the movable target members. Now with particular reference to Figs. 9 and 10 of the drawings, at the opening 86 at the pitcher's box are two target members consisting of plates 89, 90, pivotally supported one in front of the other for independent movement and adapted to control respectively the ball indicator 22 and the balls indicator wheel 34'. The target plates are shown circular in form and the front target plate is somewhat larger than the rear plate which is disposed centrally thereof, the front target plate having a central opening 98 smaller than the opening 86 to permit a shot or missile to pass therethrough and hit the rear target plate 90. The target plate 89 is provided with spaced hanger arms 89' having knife edge pivots 91 at the upper end thereof seated in bearings 92 on brackets 93. The target plate 90 has a hanger arm 94 provided with knife edge pivots 95 engaging bearings 96 on a bracket 97, which is located between and extends rearwardly beyond the brackets 93. The forward end of the trigger 23 normally abuts against the rear face of the target member 90, and said target member when struck by a shot or missile, will be caused to swing rearwardly and act upon the trigger 23 to release the ball indicator 22. The target 89 when forced rearwardly by the impact of a bullet is adapted to actuate the escapement lever 51 of the balls wheel indicator 34' through a lever 99 pivoted intermediate its ends to a bracket 100, one end of the lever normally abutting against the rear face of the target plate 89, and the other end of the lever resting upon the rear end of the lever 51. In order to guard against the rear target 90 being actuated by the front target 89 in its rearward movement, stops 90' are provided to limit the rearward movement of the front target 89.

A connection is provided between the balls wheel indicator 34' and the escapement lever $y^2$ of the conveyer $h$ whereby when said indicator wheel 34' registers the fourth ball, the escapement lever $y^2$ will be actuated to release the conveyer to carry its indicator piece $n$ around the bases. This connection is provided through levers 101, 102 and 103 pivoted respectively to brackets 104, 105 and 106. Between one end of lever 101 and the rear end of the escapement lever $y$ is a loose pin and slot connection 107, and the other end of the lever 101, which is normally depressed is engaged at its under side at 108 by one end of the lever 102. The levers 102 and 103 are connected by a loose pin and slot connection 109, and at one end of the lever 103 is an arm 110 adapted to coöperate with a cam or beveled tooth 111 on the indicator wheel 34'. At the lower end of the arm 110 is a roller 112 which normally engages the face of the wheel. As the indicator wheel 34' registers the fourth ball, the cam or tooth 111 engages the roller 112, causing the arm to be raised and lifting the end of the lever 103, the movement being transmitted through lever 102, 101, to the escapement lever $y^2$ to release the conveyer. As shown in Fig. 15 of the drawings the lever 103 at one end is bent to form a substantially U-shaped portion 113 within which is pivotally secured the upper end of the arm 110. A coiled spring 114 has its ends connected to the lever and the upper end of the arm, said spring acting to maintain the upper end of the arm in engagement with the rear part of the bent portion 113 to form a rigid connection, but permitting the arm to yield in one direction so that the tooth 111 can readily pass by the arm when the indicator wheel 34' is reset.

Turning now to Figs. 13 and 14 of the drawings, at the opening 87 of the batter's box are target members 115, 116, which are of the same construction as the target members 89, 90, at the pitcher's box except that in this instance for convenience, the pivotal mountings 117, 118, for the target members are located below the same. The target member 115 is adapted to also control the escapement mechanism of the conveyer $h$. The lever 101 is provided with an inwardly extending arm 119 which normally abuts against the rear face of the target member 115 which upon swinging rearwardly moves the said lever, which in turn actuates the escapement lever $y^2$ to release the conveyer $h$. The target 116 controls the strikes indicator wheel 33' through a lever 120 pivoted at 121, said lever having one end engaging the rear face of the target and its other end resting against the outer end of the ascapement lever 51 of the said indicator wheel.

Upon the registration of the third strike by the indicator wheel 33', the escapement lever 51 of the out indicator wheel 35' is actuated to register an out. This is accomplished through a lever 123 pivoted at 124, one end of the lever engaging the escapement lever 51 of the indicator wheel 35', and the other end of the lever having an arm 125 adapted to be forced outwardly by a cam tooth 126 on the indicator wheel 33'. The arm 125 is the same in construction and operates in a similar manner as the arm 110 of the lever 103, previously described and shown in detail in Fig. 15 of the drawings.

At each of the bases in rear of the openings 88 and 88' are pivotally supported target members 127, 128, adapted to control the escapements of the base indicator wheels 58, 59, (see Figs. 4, 5, 18 and 25 of the drawings). The target members 127, 128 have arms with knife edge pivots at their upper ends engaging bearings on hangers 129. The hangers preferably take the form shown in detail in Fig. 23 of the drawings, with an opening 129' at the front thereof permitting the easy removal and connection of the targets for purposes of renewal or repair.

Each of the target members 127, 128, has its rear face in engagement with an inwardly extending arm on the escapement lever of one of the indicator wheels 58, 59, and is adapted upon being moved rearwardly by the impact of a shot or missile, to actuate the lever to release the indicator wheel. The escapement lever for the indicator wheels at first base are designated 75, 79, and these are shown in detail in Figs. 19 and 20 of the drawings. 75′ 79′ designate the inwardly extending arms abutting against the rear faces of the targets. 129, 130 designate the escapement levers for the indicators 58, 59, at second base, the disposition of the levers being slightly varied. The escapement levers 131, 132 for the indicator wheels 58, 59 at third base are arranged similar to the arrangement of the escapement lever at first base.

The target members 127, 128, at home base are arranged one at each side thereof. In this instance the lever connection of the out target 127 with the escapement mechanism of the out wheel indicator 59 is slightly modified, said connection being made through levers 133 and 134. The lever 133 is pivoted at one end at 137 and has an inwardly extending arm 138 abutting against the rear face of the target member 127. The lever 134 is pivoted at 139, one end of said lever resting upon the free end of the lever 133, and the other end of said lever 134 resting upon one end of the escapement lever 135 of the "out" indicator wheel 59. 140 designates the escapement lever for the safe indicator wheel 58, which is adapted to be actuated to release said indicator wheel through the medium of a lever 141, the lever 141 being pivoted at one end at 142 and having its other end in engagement with the escapement lever 140, the lever 141 also having an inwardly extending arm 143′ abutting against the rear face of the said target member.

When the conveyer $h$ is released to carry the runner indicator around the bases, the pairs of targets at the bases are adapted to be shot at in succession, one player shooting to hit the target controlling the escapement of the "out" indicator to operate the same to put the runner out, while the other player shoots at the target controlling the escapement of the safe indicator to operate the same and prevent the operation of the out signal, the indicator of the target first hit registering its signal and preventing the operation of the other indicator. Means is provided whereby upon the operation of any one of the "out" indicator wheels 58 at the bases to display its signal, the trigger C of the pawl 1 will be actuated to stop the runner indicator, and the escapement lever 51 of the indicator wheel 35′ will be operated so that said wheel will register an "out". The means referred to comprises a shaft 144 mounted for oscillation in brackets 145, said shaft being provided with a plurality of arms 146, 147, 148, 149, and 150, the arm 146 at one end of the shaft normally resting upon the outer end of the escapement lever 51 of the "out" indicator wheel 35′. Lever connections are provided between each of the "out" indicator wheels 58 and the shaft 144. 151 designates the lever connection for the "out" indicator wheel 58 at first base, one end of the lever engaging the arm 147 of the shaft 144. At the other end of the lever is an arm 152 adapted to coöperate with a cam tooth 153 on the indicator wheel, said cam tooth, when the indicator wheel is operated, engaging and forcing the arm upward, actuating the lever to rock the shaft 144 and actuating the escapement lever 51 of the indicator wheel 35′ through the arm 146. The lever arm 152 is the same in construction and operates in a similar manner with the cam tooth 153 as the lever construction illustrated in Fig. 15 of the drawings, and hereinbefore described.

The lever connections for the indicator wheels 58 at second base and third base are similar to the lever connection at first base, just described. 154 designates the lever at second base and 155 the lever at third base, said levers at one end engaging respectively the arms 148 and 150 on the shaft 144.

The connection between the indicator wheel 58 at home base is made through levers 156 and 157. The lever 156 is similar in construction and coöperates with a cam tooth 153 on the wheel in a manner similar to the lever 151. The other end of lever 156 is pivotally connected to one end of lever 157, which is pivoted at 158. The other end of the lever 157 abuts against the under side of the arm 149 on the shaft 144.

Provision is made for actuating the escapement mechanism of the safe indicator wheel at each of the bases to register its signal in the event that neither of the escapements of the wheels are actuated by the pair of targets associated therewith.

This is accomplished by levers 160, 161, 162 located respectively at the first base, second base, and third base. Each lever is pivoted at one end and has its other end in engagement with the under side of the outer end of one of the escapement levers of the safe signal wheels. Each lever is provided with a cam block 163, said block being disposed to be engaged by a contact member which is shown in the form of a piece or block 165 secured by bolts 165′ to the conveyer $h$. The member 165 as it is carried around by the conveyer $h$ is adapted to engage the cam blocks 163 of the levers and force the levers outwardly to release the escapement levers of the "safe" signal wheels. To operate the safe signal at home base the member 165 engages a cam block 163, which is connected directly to the escapement lever 140 of the safe indicator wheel located at home base. An idler wheel 140′ is arranged to engage the sprocket chain at a point adjacent the location of the cam block on the lever 140 for the purpose of maintaining the chain in proper position to carry the member 165 into engagement with the under surface of the block. The sprocket wheels for the conveyer chain located at first, second and third base act in a similar way at these points. The under contact face 163' of the cam block is arc shaped, this construction permitting the operating member 165 to readily pass by the cam block as the conveyer h is reset.

Upon the registration of the third "out" by the indicator wheel 35', the escapement mechanism of the "halves" indicator is actuated to change the "half." This connection is made through a lever 166 and a shaft 167 mounted for oscillation in brackets 168. The lever 166, at one end is constructed as illustrated in Fig. 15 of the drawings to coöperate with a cam tooth 169 on the indicator wheel 35'. The other end of the lever engages an arm 170 at one end of the shaft 167, which at its other end has an arm 171 in engagement with the escapement lever 51 of the indicator wheel 36'. When the "halves" wheel changes at the end of every second half, the escapement lever 51 of the innings indicator wheel 37' is actuated and the wheel 37' registers an inning. A lever 172 pivoted at 173 has one end constructed as illustrated in Fig. 15 of the drawings to coöperate with a cam tooth 174 on the indicator wheel 36'. The other end of the lever is in engagement with the escapement lever 51 of the indicator wheel 37'.

Whenever the safe indicator wheel 58 at home plate is operated, a run is registered by the appropriate score indicator wheel. Referring particularly to Fig. 25 of the drawings, the means for this purpose comprises a lever 175 pivoted at 176, one end of said lever is constructed as illustrated in Fig. 15 of the drawings to coöperate with a cam tooth 177 on the safe indicator wheel 58. The other end of the lever bears upon the upper side of an arm 178 on a shaft 180, which is supported in brackets 181 for oscillation and to shift bodily in the direction of its length. On the shaft 180 are arms 182, 183 adapted to engage respectively with the escapement levers of the score wheel indicators. The arms 182, 183 are spaced so that when one of said arms is in position to operate its lever 51, the other arm will be out of engagement with its escapement lever 51. The shaft 180 is adapted to be shifted bodily to position either one of the arms 182, 183 in engagement with its escapement lever 51 by a lever 184 pivoted at 185. One end of the lever is engaged between collars 186 on the shaft 180. The other end of the lever is provided with a head 187 having oppositely disposed inclined faces 187' and adapted to coöperate with spaced projections or pins 188, 189 on the "halves" indicator wheel 36'. As the indicator wheel 36' changes at the end of each half inning, the lever 184 is rocked and the shaft 180 shifted to change the connections from one score indicator wheel to the other. In addition to the indicators, hereinbefore described, a bell 190 is provided and connections whereby the bell is caused to ring when the ball indicator through the rear target 115, at home base drops, when the conveyer h is released to start the runner indicator and when an out is registered at the bases. 191 designates a wheel similar in construction to the indicator wheel 35' and equipped with a similar motor and escapement mechanism. 51 designates the escapement lever for this wheel. The wheel is provided with teeth 191' adapted to engage and actuate a lever 192 which controls the striking mechanism of the bell, which may be of any approved construction. Levers 193, 194, 195 connect the escapement lever 51 of the wheel 191 with the rear target at the pitcher's box, the "out" shaft 144 and the rear target at the batter's box. In order to maintain the various levers, hereinbefore described, in proper working alinement and in some instances to limit the outward throw of the levers, U-shaped guide brackets 196 may be employed. One of said guide brackets 196 is shown in Fig. 22 of the drawings. Cover plates D in rear of the base indicators, and cover plates E at the rear of the slot of the ball indicator are provided to guard against shots passing through the board.

Resetting mechanism.

The score indicator wheel 38', 39' and the innings indicator wheel 37' are reset by levers 197, 198, 199 which are shown mounted on a stand 200 adapted to be located some distance from the board. The levers are respectively connected to the indicator wheels by cords or other flexible members 200'. These extend rearwardly from the levers over suitably located pulleys 201, and are secured and wound about the indicator wheels in one of the grooves thereof opposite to the winding of the weight motor cords of said wheels.

The means for resetting all of the other indicators and rewinding their motors comprises a shaft 202 supported in brackets 203. On the shaft are grooved pulleys 204, 205, 206. Secured to each of the indicator wheels is a cord 207 or the like, the cord being wound in one of the peripheral grooves of the wheel opposite to the winding of the motor weight cord of the wheel, said cord being connected with one of the pulleys on the shaft 202. The "out" indicator wheel 35' and the "halves" wheel 36' are reset at the end of each half inning, while the other indicator wheels, except the score wheels, 38′, 39′ and the inning wheel 37′ are reset after every "out" indicated at the bases or when a score has been registered. The cords 207 of the "out" indicator wheel 35′ and the "halves" indicator wheel 36′ are connected respectively with pulleys 204, 206, which are loose on the shaft 202 while the other pulleys 205 are all fast to the shaft. Suitable clutches 208 are provided for the wheels 35′, 36′. One member of the clutch 209 is fixed to the wheel, the wheels being adapted to be shifted longitudinally of the shaft to couple the same therewith by levers 210, 211. The lever 210 is actuated by a lug 212 on the indicator wheel 35′ while the lever 211 is actuated by a lug 213 on the "halves" wheel 36′.

214 designates the resetting cord for the drive wheel for the conveyer $h$. This cord is carried from the drive wheel over pulleys 215 and connected with a pulley 216 fast on a shaft 217. The pulley 216 is larger than the pulleys on the shaft 202, and reduction gears 218, 219′ are interposed between the shaft 217 and the shaft 202, in order to provide for the increased winding required to reset the conveyer. A drum 219 is fixed to the shaft 217, and on the stand 200 is mounted a drum 220 to which is connected an operating crank 221, the drum 219 being connected with the drum 220 by flexible members 222, 223. After the crank 221 has been operated to reset the indicator wheels, the crank is turned in the reversed direction to loosen the resetting cords and in this rotation of the shaft 202 in the reverse direction, the clutch members of pulleys 204, 206 of the indicator wheels 35′, 36′ are automatically disengaged from the members of the clutch that are fixed to the shaft 207, said pulleys being weighted at one side so that they automatically assume the proper position to leave the cords connected therewith loose.

When the conveyer $h$ is returned to normal position the escapement lever $y^2$ is automatically returned in locking engagement with the tooth of the escapement disk. This is accomplished through the medium of a lever 225 pivoted at 226. 227 is a rock shaft provided with an arm 228 at one end, which is connected with one end of the lever 225 by a link connection 229. The other end of the rock shaft has an arm 230 engaging the under side of the adjoining ends of levers $y^2$ and 101. As the conveyer is pulled back to position, just as the runner indicator piece reaches the batter's box, a part on the conveyer chain engages the forward end of the lever 225 swinging the lever and actuating the rock shaft to move the escapement lever $y^2$ into locking engagement with the tooth on the escapement disk. In the particular construction illustrated in the drawings, the contact member 165, is arranged to perform this function, in addition to that of operating the levers 160, 161, 162 and 140.

A cord tightener 234 is provided for the resetting cord of the conveyer. Coiled springs 235 may be interposed in the resetting cords of the indicator wheels to compensate for any stretching or tightening of the cords in use. The flexible rewinding members may also have lower metal chain sections 236, the weight of the chains serving to cause the lower stretches of the flexible members to hang substantially straight and prevent tangling or interference with one another.

The pairs of the targets at the bases are all arranged with the out targets to the right of the safe target, and to avoid confusion the out targets are colored the same and different from the safe targets, for instance the out targets may be red and the safe targets white. The target at the pitcher's box is colored red similar to the out targets while the target at the batter's box is colored white similar to the safe targets.

The game is adapted to be played as follows: Two or more persons may engage in the game; with only two playing, we will refer to one as A the pitcher or representing the team in the field and to the other as B the batter or the side or team at the bat. A first shoots at the pitcher's target. A hit in the bull's eye drops the ball indicator to the batter, while a misfire, hitting the outer ring of the front target, registers a ball and the registration of four balls starts the runner or runner indicator.

After the ball indicator drops, B, the batter, shoots at the batter's target where a hit in the bull's eye starts the runner indicator while a hit in the outer ring of the front target registers a strike and three strikes registers an "out."

As soon as the runner starts, both rifles shoot at the first base targets, the pitcher A at the red target in an effort to put the runner "out" and the batter at the white target to guard the runner against a put out. If A hits the red target first he stops the runner while if B hits the white target first he checks the indicator wheel of the red target and the runner continues on to the next base, both shooting at each successive base until the runner is put out or reaches home plate scoring a run, which will be automatically registered by one score wheel or the other. The machine is reset after each "out" or "run" and the play is repeated until three men are out (side out), after which the players change sides, B being the batter and A the pitcher, the game continuing throughout as many innings as desired.

It will be understood that various changes and modifications in the particular construction, combination and arrangement of parts illustrated in the drawings, as will appeal to those skilled in the art may be made without departing from the broad principles of the invention, the scope of which is defined in the appended claims.

What we claim is:

1. In a game apparatus, the combination of a single indicating device adapted to denote plays or moves of a game, and a plurality of independent targets controlling the operation of said indicating device.

2. In a game apparatus, the combination with the representation of a field, a single indicating device associated with the field to denote different moves or plays in a game, and a plurality of targets located at different points in the field and controlling the operation of said indicating device.

3. In a game apparatus, the combination with the representation of a field, an indicator movable over the field to denote plays or moves in a game, and a plurality of independent targets controlling the operation of said indicator.

4. In a game apparatus, the combination with the representation of a field, an indicator movable over the field to denote plays or moves in a game, and a plurality of targets located in the field at different points, and controlling the operation of said indicator.

5. In a game apparatus, the combination with the representation of a field, an indicator movable over the field to denote moves or plays in a game, means adapted to maintain the indicator in one position in the field and adapted to be operated to release the indicator and permit the same to move to another position in the field, and a plurality of independent targets located at different points in the field, said means being adapted to be operated through each of the targets to release the indicator.

6. In a game apparatus, the combination with the representation of a field, of an indicator movable over the field to denote moves or plays in a game, a device adapted to stop the indicator in its movement over the field, and a plurality of targets located at different points in the field, said device being adapted to be controlled through each one of the targets to stop the indicator in its movement over the field.

7. In a game apparatus, the combination with the representation of a field, an indicator movable over the field to denote moves or plays in a game, means for stopping the indicator at a plurality of points in its movement over the field, and a plurality of targets located at different points in the field, said means being adapted to be controlled through the different targets to stop the indicator in its movement over the field.

8. In a game apparatus, the combination with the representation of a field, an indicator movable over the field, operating means for the indicator, means adapted to maintain the indicator locked against movement by its operating means and adapted to be released to permit the indicator to be moved over the field by its operating means, a device adapted to stop the indicator in its movement over the field by its operating means, and independent targets, said means being adapted to be controlled through one of the targets to release the indicator, and said device being adapted to be controlled through the other target to stop the indicator in its movement over the field.

9. In a game apparatus, the combination with the representation of a field, an indicator movable over the field to denote moves or plays in a game, operating means for the indicator, means adapted to hold the indicator from movement by its operating means, means for stopping the indicator at different points in its movement over the field by its operating means, a target adapted to control the first mentioned means to release the indicator, and a plurality of targets located at different points in the field, said second mentioned means being adapted to be controlled through each one of said last mentioned targets to stop the indicator at different points in its movement over the field.

10. In a game apparatus, the combination with the representation of a field, an indicator movable over the field to denote thereon features in a game or contest, means to maintain the indicator in one position on the field and for moving the indicator from said position over the field, target mechanism controlling said means, a device for stopping the movement of the indicator by its operating means, and target mechanism independent of the first mentioned target mechanism controlling said last mentioned means.

11. In a game apparatus, the combination with the representation of a field, an indicator movable over the field to denote plays or moves in a game or contest, a conveyer for the indicator, a motor to operate the conveyer, means for locking the conveyer against movement, said means being adapted to be operated to release the conveyer, target mechanism adapted to control said means, and means for stopping the movement of the indicator by its conveyer, and target mechanism independent of the first mentioned target mechanism for controlling said last mentioned means.

12. In a game apparatus, the combination of a plurality of indicating devices to display different signals, a plurality of independent targets, the operation of the indicating devices being adapted to be controlled through the targets, each one of the targets being operatively connected with one of the indicating devices to directly control the same, and means whereby the indicating devices can only be operated one at a time.

13. In a game apparatus, a plurality of indicating devices to display different signals, a plurality of independent targets, the operation of the indicating devices being controlled through the targets, each one of the targets being operatively connected with one of the indicating devices to directly control the same, and means whereby the operation of one of the indicating devices prevents the operation of another at the same time.

14. In a game apparatus, the combination with a plurality of indicating devices to display different signals, a plurality of independent targets, the operation of the indicating devices being adapted to be effected through the targets, each one of said targets being operatively connected with one of the indicating devices to directly control the same, said indicating devices being constructed and arranged whereby the operation of one prevents the operation of another at the same time.

15. In a game apparatus, the combination with a pair of rotatable indicators to display different signals of a pair of independent targets, the operation of the indicators being adapted to be controlled through the targets, and each target being operatively connected with one of the indicators to directly control the same, said indicators being constructed and arranged whereby the operation of one prevents the operation of the other.

16. In a game apparatus, the combination with a pair of rotatable indicators to display different signals, of a pair of independent targets, the operation of the indicators being adapted to be effected through the targets, and each target being operatively connected with one of the indicators to directly control the same, said indicators being constructed and arranged to intermesh one with the other whereby the operation of one prevents the operation of the other.

17. In a game apparatus, the combination with a pair of rotatable indicators to display different signals, of a pair of independent targets, the operation of the indicators being adapted to be effected through the targets, and each target being operatively connected with one of the indicators to directly control the same, said indicators being constructed and arranged whereby the operation of one prevents the operation of the other, and means on the indicators adapted to prevent the blocking of both indicators by each other at the same time when both are released one before the other.

18. In a game apparatus, the combination of a pair of rotatable indicators to display different signals, of a pair of independent targets the operation of the indicators being adapted to be effected through the targets, and each target being operatively connected with one of the indicators to directly control the same, said indicators being constructed and arranged whereby the operation of one prevents the operation of the other and pointed projections on the indicators acting to prevent the blocking of both of the indicators by each other at the same time, when both are released one before the other.

19. In a game apparatus, the combination with a pair of rotatable indicators to display different signals, of a pair of independent targets, the operation of the indicators being adapted to be effected through the targets, and each target being operatively connected with one of the indicators to directly control the same, said indicators being constructed and arranged whereby the operation of one prevents the operation of the other, and knife edge projections on the indicators acting to prevent the blocking of both indicators at the same time by each other when both are released one before the other.

20. In a game apparatus, the combination with a pair of rotatable indicators to display different signals, of a pair of independent targets, the operation of the indicators being adapted to be effected through the targets and each target being operatively connected with one of the indicators to directly control the same, each of said indicators consisting of a disk provided with an opening extending inwardly from its periphery, said indicators being adapted to be normally positioned with their openings opposite each other, the disks being disposed for rotation in the same vertical plane, and the arrangement of the disks being such that each disk is adapted to turn into the opening of the other and lock the same from operation.

21. In a game apparatus, the combination of a pair of rotatable indicators to display different signals a pair of independent targets, the operation of the indicators being adapted to be effected through the targets and each target being operatively connected with one of the indicators to directly control the same, each of said indicators consisting of a disk provided with an opening extending inwardly from its periphery, said indicators being adapted to be normally positioned with their openings opposite each other, said disks being disposed for rotation in the same vertical plane and the arrangement of the disks being such that each disk is adapted to turn into the opening of the other and lock the same from operation, and a pointed projection on each disk at the upper edge of the opening thereof, said projections being adapted to prevent blocking of both disks at the same time by each other when both are released one before the other.

22. In a game apparatus, the combination with a pair of rotatable indicators to display different signals, of a pair of independent targets, the operation of the indicators being adapted to be effected through the targets and each target being operatively connected with one of the indicators to directly control the same, each of said indicators consisting of a disk provided with an opening extending inwardly from its periphery, said indicators being adapted to be normally positioned with their openings opposite each other, said disks being disposed for rotation in the same vertical plane, and the arrangement of the disks being such that each disk is adapted to turn into the opening of the other and lock the same from operation, and a knife edge projection on each disk at the upper edge of the opening thereof, said knife edge projections being adapted to prevent blocking of both disks at the same time by each other, when both are released one before the other.

23. In a game apparatus, the combination with a pair of rotatable indicators to display different signals, of a pair of independent targets, the operation of the indicators being adapted to be effected through the targets, and each target being operatively connected with one of the indicators to directly control the same, each of said indicators consisting of a disk provided with an opening extending inwardly from the periphery thereof, the inner wall of the opening extending in an arc of a circle concentric with the periphery of the companion disk, and a knife edge projection extending forwardly from the upper edge of the curved wall, the disks being disposed for rotation in the same vertical plane, operating means for the disks, means for normally maintaining the disks with their openings and knife edge projections disposed opposite each other, each disk being adapted to be rotated toward the other disk in the opening thereof, and when so operated serving to lock the other disk from operation, the knife edge projections acting to prevent the blocking of both disks at the same time by each other, when both disks are released one before the other, and the knife edge projection of one disk being adapted to engage the curved wall of the opening of one disk, and the knife edge projection of the other disk to contact with the periphery of the companion disk.

24. In a game apparatus, the combination with a pair of rotatable indicators to display different signals, said indicators being constructed and arranged whereby the operation of one prevents the operation of the other, a motor and escapement for each indicator, and independent targets each operatively connected with the escapement of one indicator to directly control the same.

25. In a game apparatus, the combination of the representation of a base ball field, a pair of indicators located in the field at each base, to denote respectively "safe" and "out", a pair of independent targets located at each base, the operation of each pair of indicators being controlled through a pair of the targets and one target of each pair being operatively connected with one of the pairs of indicators to directly control the same, and means whereby only one indicator of each pair can be operated at the same time.

26. In a game apparatus, the combination of the representation of a base ball field, a pair of indictors located in the field at each base, to denote respectively "safe" and "out", a pair of independent targets located at each base, the operation of each pair of indicators being controlled through a pair of the targets and one target of each pair being operatively connected with one of the pairs of indicators to directly control the same, and each pair of indicators being constructed and arranged whereby the operation of one prevents the operation of the other.

27. In a game apparatus, the combination of a board bearing the representation of a base ball field, and having an opening through the face thereof at each base, a pair of rotatable indicators at each base supported on the board in rear of and at each side of the opening, one of said indicators bearing a marking to denote " safe " and the other a marking to denote " out," and a pair of independent targets for each pair of indicators at each base, the operation of the indicators being controlled through the targets and one target of each pair being operatively connected with one indicator of each pair to directly control the same, the pairs of indicators being constructed and arranged whereby the operation of one prevents the operation of the other.

28. In a game apparatus, a board bearing the representation of a base ball field, and having an opening through the face thereof at each base, a pair of rotatable indicators at each base, supported on the board in rear of and at each side of the opening, one of said indicators bearing a marking to denote " safe " and the other a marking to denote " out," a motor and escapement mechanism for each indicator, a pair of targets for each pair of indicators at each base, one of the targets of each pair being operatively connected with the escapement mechanism of one indicator of each pair to directly control the same, and means whereby only one indicator of each pair can be operated at the same time.

29. In a game apparatus, the combination of a plurality of sets of indicating devices, the indicating devices of each set being adapted to display different signals, a plurality of sets of independent targets, one set of targets controlling each set of indicators, each one of the targets of the sets being operatively connected with one of the indicating devices of the set to directly control the same, and means whereby the operation of one of the indicating devices of one set prevents the operation of another indicating device of that set at the same time.

30. In a game apparatus, the combination with a board, a plurality of pairs of indicators arranged at different points about the board, each pair of indicators being adapted to display different signals, a pair of independent targets for each pair of indicators, the operation of the indicators being adapted to be effected through the targets, and one target of each pair being operatively connected with an indicator of each pair to directly control the same, each pair of indicators being constructed and arranged whereby the operation of one prevents the operation of the other.

31. In a game apparatus, the combination with the representation of a field, of an indicator movable over the field to denote moves or plays in a game, a device adapted to stop the indicator in its movement over the field, and a target, said device being adapted to be controlled through said target to stop the indicator in its movement over the field.

32. In a game apparatus, the combination of the representation of a base ball field, an indicator movable over the field to denote the delivery of the ball by the pitcher to the batter, an indicator to denote "balls," and independent targets located at the pitcher's box, one of said targets controlling the operation of the ball indicator, and the other target controlling the operation of the "balls" indicator.

33. In a game apparatus, the combination of the representation of a base ball field, an indicator movable over the field to simulate the throwing of the ball by the pitcher to the batter, an indicator to register balls, a pair of independent targets located at the pitcher's box one in front of the other, the front target being provided with an opening constituting the bull's eye for the rear target, the rear target controlling the operation of the ball indicator, and the front target controlling the operation of the balls indicator.

34. In a game apparatus, the combination with the representation of a field, of an indicator movable over the field to denote plays or moves in a field, operating means for said indicator, a plurality of targets located at different points in the field along the path of movement of the indicator and adapted to control the operation of the indicator, and means for varying the speed of movement of the indicator by its operating means.

35. In a game apparatus, the combination of the representation of a base ball field, an indicator movable over the field to represent a player running the bases, an indicator to register "strikes," and independent targets located at the batter's box, one of said targets controlling the operation of the runner indicator, and the other target controlling the operation of the "strikes" indicator.

36. In a game apparatus, the combination of the representation of a base ball field, an indicator movable over the field around the bases, a "strikes" indicator, and a pair of independent targets located in the field at the batter's box one in front of the other, the front target being provided with an opening constituting the bull's eye for the rear target, the rear target controlling the operation of the first mentioned indicator, and the front target controlling the "strikes" indicator.

37. In a game apparatus, the combination of a board and sets of indicating mechanism and target mechanism located at different points about the board, each set of target and indicating mechanism comprising a pair of rotatable indicators to display different signals and a pair of independent targets, each target being operatively connected with one of the indicators to directly control the same, said indicators being constructed and arranged whereby the operation of one prevents the operation of the other.

38. In a game apparatus, the combination of the representation of a base ball field, an indicator, a conveyer for the indicator adapted to move the same around the bases, a motor for the conveyer, mechanism normally maintaining the conveyer locked against movement by its motor with the indicator at the batter's box, said mechanism being adapted to be actuated to release the conveyer, and a target located in the field at the batter's box controlling said mechanism.

39. In a game apparatus, the combination of the representation of a base ball field, an indicator, a conveyer for the indicator adapted to move the same around the bases, a motor for the conveyer, mechanism normally maintaining the conveyer locked against movement by its motor with the indicator at the batter's box, said mechanism being adapted to be actuated to release the conveyer, a target located in the field at the pitcher's box controlling said mechanism, a device to check the movement of the conveyer, and independent target mechanism located at each of the bases, and adapted to control said devices to check the movement of the indicator by the conveyer.

40. In a game apparatus, the combination of the representation of a base ball field, an indicator, a conveyer for the indicator adapted to move the same around the bases, a motor for the conveyer, mechanism normally maintaining the conveyer locked against movement by its motor with the indicator at the batter's box, said mechanism being adapted to be actuated to release the conveyer, a target located in the field at the batter's box controlling said mechanism, a balls indicator, an independent target controlling the operation of the balls indicator, and a connection between said indicator and the said mechanism whereby upon the registration of four balls said mechanism will be actuated to release the conveyer.

41. In a game apparatus, the combination of the representation of a base ball field, an indicator, a conveyer for the indicator adapted to move the same around the bases, a motor for the conveyer and escapement mechanism normally maintaining the conveyer locked against movement by its motor, with the indicator at the batter's box, said mechainsm being adapted to be actuated to release the conveyer, a target located in the field controlling said mechanism, and resetting means for the conveyer, said resetting means including a part on the conveyer adapted, as the conveyer is returned to normal position, to effect the actuation of the escapement mechanism to lock the conveyer.

42. In a game apparatus, the combination of the representation of a base ball field, an indicator to denote "strikes", and an indicator to denote "outs", a target controlling the "strikes" indicator, and an operative connection between the "strikes" indicator and the "outs" indicator whereby upon the registration of three strikes the outs indicator will register an out.

43. In a game apparatus, the combination of the representation of a base ball field, signals in the field to denote "outs", an indicator to denote "strikes", an indicator to register "outs", independent targets controlling the "strikes" indicator, and the "out" signals, and operative connections between the "out" signals, and the "strikes" indicator with the "outs" indicator whereby upon the operation of an "out" signal or the registration of three strikes the outs indicator will be operated to register an out.

44. In a game apparatus, the combination of the representation of a base ball field, a "strikes" indicator, an "outs" indicator, a "halves" indicator and an "innings" indicator, a target controlling the operation of the "strikes" indicator, an operative connection between the "strikes" indicator and the "outs" indicator whereby upon the registration of "three strikes" the "outs" indicator will register an out, an operative connection between the "outs" indicator and the "halves" indicator whereby upon the registration of three outs the halves indicator will be operated to change the half, and an operative connection between the halves indicator and the innings indicator, whereby upon the operation of the halves wheel after every second half inning, the innings indicator will be operated to register an inning.

45. In a game apparatus, the combination of the representation of a base ball field, a strikes indicator, an "outs" indicator, a "halves" indicator and an "innings" indicator, a target controlling the operation of the "strikes" indicator, an operative connection between the "strikes" indicator and the "outs" indicator whereby upon the registration of three strikes the out indicator will register an out, an operative connection between the "outs" indicator and the "halves" indicator whereby upon the registration of three "outs" the "halves" indicator will be operated to change the "half," and an operative connection between the "halves" indicator and the "innings" indicator whereby upon the operation of the "halves" wheel after every second "half inning", the "innings" indicator will be operated to register an "inning", and resetting mechanism for all of the indicators.

46. In a game apparatus, the combination of the representation of a base ball field, a strikes indicator, and "outs" indicator, a "halves" indicator and an "innings" indicator, a target controlling the operation of the "strikes" indicator, an operative connection between the "strikes" indicator and the "outs" indicator whereby upon the registration of three strikes the out indicator will register an "out", an operative connection between the "outs" indicator and the "halves" indicator whereby upon the registration of three "outs" the "halves" indicator will be operated to change the "half", and an operative connection between the "halves" indicator and the "innings" indicator whereby upon the operation of the "halves" wheel after every second "half" the "innings" indicator will be operated to register an "inning", and resetting mechanism for all of the indicators including a shaft, pulleys on the shaft, flexible rewinding connections between the pulleys on the shaft and the respective indicators.

47. In a game apparatus, the combination of the representation of a base ball field, indicators at the bases to signal "safe", two separate score indicators, a "halves" indicator, means whereby one of the score wheels will be operated to register a run upon each operation of the "safe" signals at home base, said means including an operative connection with said safe signals, and mechanism acting automatically to change said connection from one score wheel to the other when the halves indicators is operated to change the half.

48. In a game apparatus, the combination of the representation of a base ball field, indicators at the bases to signal safe, two separate score indicators, a "halves" indicator, means whereby one of the score wheels will be operated to register a run upon each operation of the safe signal at home base, said means including an operative connection with said "safe" signal, and mechanism actuated by the "halves" indicator to change said connection from one score wheel to the other upon the operation of the "halves" wheel to change the "half".

49. In a game apparatus, the combination of the representation of a base ball field, indicators to register "strikes", "balls", "outs" the "half innings", "innings", and the score for each side or team, a plurality of targets controlling the operation of said indicators, and resetting means for the indicators comprising a rotary shaft, operating means for the shaft, pulleys on the shaft, a rewinding flexible connection connecting each of the indicators with one of the pulleys on the shaft, some of the pulleys being fast on the shaft, and others loose on the shaft, and means acting automatically to clutch and unclutch said loose pulleys on the shaft to effect the resetting of certain of the indicators at periods different from the periods of resetting others of the indicators.

50. In a game apparatus, the combination of the representation of a base ball field, a "strikes" indicator, an "outs" indicator, a "halves" indicator and an "innings" indicator, a target controlling the operation of the "strikes" indicator, an operative connection between the "strikes" indicator and the "outs" indicator whereby upon the registration of three strikes the outs indicator will register an out, an operative connection between the outs indicator and the halves indicator whereby upon the registration of three outs the halves indicator will be operated to change the half, and an operative connection between the halves indicator and the innings indicator, whereby upon the operation of the halves wheel after every second half, the innings indicator will be operated to register an inning, and an audible signal, operative connections between said signal and certain of the other indicators whereby said audible signal will be operated by the same.

51. In a game apparatus, the combination of the representation of a field, an indicator movable over the field to denote plays or moves in a game, operating means for the indicator, a device adapted to stop the indicator in its movement over the field, a plurality of pairs of separate player targets at different points in the field along the path of movement of the indicator, said device being adapted to be controlled to effect the stopping of the indicator through one target of each pair of targets, and the operation of the other target of the pair being adapted to prevent the operation of said device through the first mentioned target.

52. In a game apparatus, the combination of the representation of a field, an indicator movable over the field to denote plays or moves in a game, a motor for the indicator, a device adapted to stop the indicator in its movement over the field, a plurality of pairs of separate player targets located at different points in the field along the path of movement of said indicator, said device being adapted to be controlled in its operation to stop the indicator through one target of each pair of targets, and the operation of the other target of each pair being adapted to prevent the operation of said device through the first mentioned target, and means for regulating and varying the speed of travel of the indicator.

53. In a game apparatus, the combination of the representation of a field, an indicator movable over the field to denote plays or moves in a game, means for stopping the indicator in its movement over the field, a pair of separate player targets, said means being adapted to be controlled through the operation of one of the targets to effect the stopping of the indicator, and the operation of the other target in advance of the first mentioned target being adapted to render the latter ineffective to control said means.

54. In a game apparatus, the combination of the representation of a field, an indicator movable over the field to denote plays or moves in a game, a motor for the indicator, means for stopping the indicator in its movement over the field, a pair of separate player targets, said means being adapted to be controlled through the operation of one of the targets to effect the stopping of the indicator, and the operation of the other target in advance of the first mentioned target being adapted to render the latter ineffective to control said means, and means for varying the speed of travel of said indicator.

55. In a game apparatus, the combination of the representation of a field, an indicator movable over the field to denote plays or moves in a game, and a second indicator adapted to be actuated through the first mentioned indicator in its movement over the field.

56. In a game apparatus, the combination of the representation of a field, an indicator movable over the field to denote plays or moves of a game, means for stopping the indicator in its movement over the field, a pair of indicating devices to display different signals, a pair of separate player targets, each one of the targets being operatively connected with one of the indicating devices to directly control the same, an operative connection between one of said indicating devices and said means to control the operation of said means to stop the indicator, and means whereby the operation of one of the indicating devices prevents the operation of the other.

57. In a game apparatus, the combination of the representation of a field, an indicator movable over the field to denote plays or moves in a game, means for stopping the indicator in its movement over the field, a pair of indicating devices to display different signals, a pair of separate player targets, each one of the targets being operatively connected with one of the indicating devices to directly control the same, an operative connection between one of said indicating devices and said means to control the operation of said means to stop the indicator, means whereby the operation of one of the indicating devices prevents the operation of the other, and means for operating the other indicator by the first mentioned movable indicator in its movement over the field.

58. In a game apparatus, the combination of a plurality of indicator devices to display different signals, a plurality of independent targets, the operation of the indicating devices being adapted to be controlled through the targets, each one of the targets being operatively connected with one of the indicating devices to directly control the same, means whereby the indicating devices can only be operated one at a time, and an audible signal, and means for effecting the operation of the audible signal upon the operation of one of said indicating devices.

59. In a game apparatus, the combination of the representation of a base ball field, a pair of indicators located in the field adjacent each base, to denote respectively "safe" and "out", a pair of independent targets located adjacent each base, the operation of each pair of indicators being controlled through a pair of targets and one target of each pair being operatively connected with one of the pairs of indicators to directly control the same, means whereby only one indicator of each pair can be operated at the same time, a score indicator, an operative connection between the "safe" signal at home base and the score indicator whereby upon the operation of the "safe" signal at home base the score indicator will be operated to register a score.

60. In a game apparatus, the combination of a base ball field, a pair of indicators located in the field adjacent each base, to denote respectively "safe" and "out", a pair of independent targets located adjacent each base, the operation of each pair of indicators being controlled through a pair of targets and one target of each pair being operatively connected with one of the pairs of indicators to directly control the same, means whereby only one indicator of each pair can be operated at the same time, an "outs" indicator, an operative connection between the "outs" indicator and the "out" signals whereby upon the operation of any of the "out" signals the "outs" indicator will be operated to register an out.

61. In a game apparatus, the combination of the representation of a base ball field, an indicator movable over the field around the bases, a pair of indicators located in the field at each base to denote respectively "safe" and "out", a pair of independent targets located adjacent each base, the operation of each pair of indicators being adapted to be controlled through the adjacent pair of targets, one target of each pair being operatively connected with one of the pairs of indicators to directly control the same, and means adapted to effect the operation of the "safe" signal through the movement of the said movable indicator around the bases.

62. In a game apparatus, the combination of the representation of a base ball field, an indicator movable over the field around the bases, a pair of indicators located in the field at each base to denote respectively "safe" and 'out", a pair of independent targets located adjacent each base, the operation of each pair of indicators being adapted to be controlled through the adjacent pair of targets, one target of each pair being operatively connected with one of the pairs of indicators to directly control the same, means adapted to effect the operation of the "safe" signal through the movement of the said movable indicator around the bases, and means whereby only one of the indicators of each pair of indicators can be operated at the same time.

63. In a game apparatus, the combination of the representation of a base ball field, an indicator movable over the field to denote the delivery of the ball by the pitcher to the batter, an indicator to denote "balls", and independent targets, one of said targets controlling the operation of the ball indicator, and the other target controlling the operation of the "balls" indicator.

64. In a game apparatus, the combination of the representation of a base ball field, an indicator movable over the field around the bases, a "strikes" indicator, and a pair of independent targets, arranged one in front of the other, the front target being provided with an opening constituting the "bull's eye" for the rear target, the rear target controlling the operation of the first indicator, and the front target controlling the "strikes" indicator.

65. In a game apparatus, the combination of a board and sets of indicating mechanism, and target mechanism located at different points about the board, each set of targets and indicating mechanism comprising a pair of rotatable indicators to display different signals, and a pair of independent targets, each target being operatively connected with one of the indicators to control the same.

66. In a game apparatus, the combination of a plurality of separate player targets and indicating means operatively connected with and adapted to display a signal for each target, said indicating means being operable through each one of the targets but only operable by one target at a time to display a signal.

67. A game apparatus comprising a target, movable indicating means governed by the target, and a target having associated therewith means for controlling the movement of the movable indicating means.

68. A game apparatus comprising a target, an indicator operable through the target an associated target, and means controlled by the latter for determining the game value denoted by the indicator.

69. A game apparatus comprising a target, an indicator operable through the target, an associated target, means controlled by the latter for determining the game value denoted by the indicator, and means for registering the game value denoted by the indicator.

70. A game apparatus comprising a target, an indicator operable through the target, and means for registering the game values denoted by the indicator.

71. A game apparatus comprising target mechanism, indicating means adapted to denote different game values operable through the target mechanism, and means connected with said indicating means for registering the different game values denoted by the indicating means.

72. A base ball game apparatus comprising target mechanism, indicating means adapted to denote game values in a base ball game, and operable through the target mechanism, and means connected with said indicating means for registering the score in accordance with the game values denoted by the indicating means.

73. A game apparatus comprising target mechanism, indicating means adapted to denote game values in a base ball game including "out," "safe," "a run," said indicating means being operable through the target mechanism, and means connected with the indicating means for registering the score in accordance with the game values denoted by said indicating means.

74. A game apparatus comprising target mechanism, indicating means adapted to denote game values in a base ball game including a "ball", "a strike", "out", "safe", "a run", said indicating means being operable through the target mechanism, and means connected with the indicating means for registering the score in accordance with the game values denoted by said indicating means.

75. A base ball game apparatus comprising target mechanism, indicating means adapted to denote different game values in a base ball game, including "a ball", "a strike", "a hit", "out", "safe", "a run", said indicating means being operable through the target mechanism, and means connected with the indicating means for registering the score in accordance with the game values denoted by the indicating means.

76. In a base ball game apparatus, the combination of the representation of a field, an indicator movable over the field to denote the delivery of the ball by the pitcher to the batter, an indicator to denote "a ball", and target mechanism including adjacent target sections, one of said target sections controlling the operation of the ball indicator, and the other target section controlling the operation of the balls indicator.

77. In a base ball game apparatus, the combination of the representation of a field, an indicator movable over the field to denote the delivery of the ball by the pitcher to the batter, an indicator to denote "a ball", and target mechanism comprising adjacent target sections, one of said target sections controlling the operation of the first mentioned indicator, and the other target section controlling the operation of the "balls" indicator, the last mentioned target section being greater in size than the other target section.

78. In a base ball game apparatus, the combination of the representation of a field, an indicator movable over the field to represent a player running the bases, an indicator to represent "a strike", and target mechanism including adjacent target sections, one of said target sections controlling the operation of the "runner" indicator, and the other target section controlling the operation of the "strike" indicator.

79. In a base ball game apparatus, the combination of the representation of a field, an indicator movable over the field to represent a player running the bases, an indicator to represent "a strike", and target mechanism including adjacent target sections, one of said target sections controlling the operation of the "runner" indicator, and the other target section controlling the operation of the "strike" indicator, said last mentioned target section being larger than the first mentioned target section.

80. In a base ball game apparatus, the combination of the representation of a field, an indicator movable over the field to represent a player running the bases, an indicator to represent "a strike", and target mechanism including adjacent target sections, one of said target sections controlling the operation of the "runner" indicator, and the other target section controlling the operation of the "strike" indicator, said last mentioned target section being larger than the first mentioned target section, said target sections being arranged one in front of the other with the smaller target section disposed centrally of the larger target section.

81. In a game apparatus, the combination with a pair of rotatable indicators to display different signals, of a pair of independent targets, the operation of the indicators being adapted to be effected through the targets, and each target being operatively connected with one of the indicators to directly control the same, said indicators being constructed and arranged to intermesh one with the other whereby the operation of one prevents the operation of the other, one of said indicators having a part adapted to engage the other indicator and provide a relatively small engagement between the indicators.

82. In a game apparatus, the combination with a pair of rotatable indicators to display different signals, of a pair of independent targets, the operation of the indicators being adapted to be effected through the targets, and each target being operatively connected with one of the indicators to directly control the same, said indicators being constructed and arranged to intermesh one with the other whereby the operation of one prevents the operation of the other, and said indicators being constructed to engage each other to a relatively small extent.

83. In a game apparatus, the combination with a pair of rotatable indicators to display different signals, of a pair of independent targets, the operation of the indicators being adapted to be effected through the targets, and each target being operatively connected with one of the indicators to directly control the same, said indicators being constructed and arranged to intermesh one with the other whereby the operation of one prevents the operation of the other, each of said indicators being provided with a relatively small bearing portion adapted to engage the other indicator.

84. In a game apparatus, the combination of a pair of rotatable indicators to display different signals, a pair of independent targets, the operation of the indicators being adapted to be effected through the targets and each target being operatively connected with one of the indicators to directly control the same, each of said indicators consisting of a disk provided with an opening extending inwardly from its periphery, said indicators being adapted to be normally positioned with their openings opposite each other, said disks being disposed for rotation in the same vertical plane and the arrangement of the disks being such that each disk is adapted to turn into the opening of the other and lock the same from operation, said disks being constructed and arranged to have a relatively small engagement with each other.

85. In a game apparatus, the combination of a pair of rotatable indicators to display different signals, a pair of independent targets, the operation of the indicators being adapted to be effected through the targets and each target being operatively connected with one of the indicators to directly control the same, each of said indicators consisting of a disk provided with an opening extending inwardly from its periphery, said indicators being adapted to be normally positioned with their openings opposite each other, said disks being disposed for rotation in the same vertical plane and the arrangement of the disks being such that each disk is adapted to turn into the opening of the other and lock the same from operation, and means on the disks providing a relatively small engagement therebetween.

86. In a game apparatus, the combination of a pair of rotatable indicators to display different signals, a pair of independent targets, the operation of the indicators being adapted to be effected through the targets and each target being operatively connected with one of the indicators to directly control the same, each of said indicators consisting of a disk provided with an opening extending inwardly from its periphery, said indicators being adapted to be normally positioned with their openings opposite each other, said disks being disposed for rotation in the same vertical plane and the arrangement of the disks being such that each disk is adapted to turn into the opening of the other and lock the same from operation, one of the disks having a projecting portion adapted to engage the other and providing a relatively small engagement between the disks.

87. A base ball game apparatus comprising target mechanism, indicating means adapted to denote game values in a base ball game, and operable through the target mechanism, means connected with said indicating means for registering the score in accordance with the game values denoted by the indicating means, and resetting mechanism for the indicating means.

88. In a game apparatus, the combination with the representation of a field, an indicator movable over the field, operating means for the indicator, means adapted to maintain the indicator locked against movement by its operating means and adapted to be released to permit the indicator to be moved over the field by its operating means, a device adapted to stop the indicator in its movement over the field by its operating means, independent targets, said means being adapted to be controlled through one of the targets to release the indicator, said device being adapted to be controlled through the other target to stop the indicator in its movement over the field, and resetting mechanism for the indicators, the locking means and said device.

89. In a game apparatus, the combination of a plurality of separate player targets and indicating means operatively connected with and adapted to display a signal for each target, said indicating means being operable through each one of the targets but only operable by one target at a time to display a signal, and resetting mechanism for the indicating means.

90. In a game apparatus, the combination with a pair of rotatable indicators to display different signals, said indicators being constructed and arranged whereby the operation of one prevents the operation of the other, a motor and escapement for each indicator, independent targets each operatively connected with the escapement of one indicator to directly control the same, and resetting mechanism for the rotatable indicators.

91. In a game apparatus, the combination with a field, an indicator movable over the field, operating means for the indicator, a device adapted to stop the indicator in its movement over the field, a target controlling said device, means for regulating the speed of movement of the indicator by its operating means, resetting means for the indicator, and means for disconnecting the regulating means from the indicator during the resetting thereof by the resetting mechanism.

92. In a game apparatus, the combination of a plurality of indicating devices, an escapement mechanism for each indicating device, target mechanism controlling the escapement mechanism of the indicators, and resetting mechanism for the indicators comprising a reel, and a flexible connection between the reel and each indicating device.

93. In a game apparatus, the combination of an indicator consisting of a wheel or disk provided with a pair of peripheral grooves, a flexible member connected with the wheel to engage one of the grooves thereof, a weight connected with said flexible member and adapted to move the wheel in one direction, an escapement mechanism for the indicator, a target controlling the escapement mechanism of the indicator, and resetting mechanism for the indicator wheel including a reel, and a flexible member connected at one end with the reel and at its other end with the indicator wheel to engage the other peripheral groove therein.

94. In a game apparatus, the combination of indicating mechanism including a plurality of visual indicators and an audible signal adapted to be operated upon the operation of one of said visual indicators, and target mechanism controlling the visual indicators.

In testimony whereof we hereunto affix our signatures in the presence of two witnesses.

JOHN W. BAKER.
GEORGE HENRY PARKER.

Witnesses:
DOROTHY J. TILLEY,
EDMUND RYAN.

Copies of this patent may be obtained for five cents each, by addressing the "Commissioner of Patents, Washington, D. C."